United States Patent
Gao et al.

(10) Patent No.: US 8,422,159 B2
(45) Date of Patent: Apr. 16, 2013

(54) MICROWAVE-ASSISTED MAGNETIC RECORDING WITH COLLOCATED MICROWAVE AND WRITE FIELDS

(75) Inventors: Kaizhong Gao, Eden Prairie, MN (US); Alexandru Cazacu, Londonderry (IE); Robert William Lamberton, Co Derry (IE); Michael Leigh Mallary, Harmony, PA (US)

(73) Assignee: Seagate Technology LLC, Cupertino, CA (US)

( * ) Notice: Subject to any disclaimer, the term of this patent is extended or adjusted under 35 U.S.C. 154(b) by 897 days.

(21) Appl. No.: 12/478,461

(22) Filed: Jun. 4, 2009

(65) Prior Publication Data

US 2010/0309577 A1 Dec. 9, 2010

(51) Int. Cl.
*G11B 21/02* (2006.01)
*G11B 5/60* (2006.01)

(52) U.S. Cl.
USPC ............................................ 360/75; 360/235.4

(58) Field of Classification Search ................ None
See application file for complete search history.

(56) References Cited

U.S. PATENT DOCUMENTS

| | | | |
|---|---|---|---|
| 6,785,092 B2* | 8/2004 | Covington et al. | 360/125.45 |
| 7,457,080 B2 | 11/2008 | Watabe et al. | |
| 8,116,031 B2* | 2/2012 | Alex et al. | 360/123.02 |
| 2007/0253106 A1 | 11/2007 | Sato et al. | |
| 2008/0068748 A1* | 3/2008 | Olson et al. | 360/110 |
| 2008/0117545 A1* | 5/2008 | Batra et al. | 360/125.01 |
| 2008/0137224 A1* | 6/2008 | Gao et al. | 360/55 |
| 2009/0002895 A1* | 1/2009 | Pust et al. | 360/319 |
| 2009/0080106 A1* | 3/2009 | Shimizu et al. | 360/75 |

* cited by examiner

*Primary Examiner* — Kevin Bernatz
(74) *Attorney, Agent, or Firm* — Alan G. Rego; Westman, Champlin & Kelly, P.A.

(57) ABSTRACT

Methods and devices are provided for microwave-assisted magnetic recording with collocated microwave and write fields. An illustrative device includes a magnetic write pole and one or more alternating-field components. The magnetic write pole is configured for providing a magnetic write field. The one or more alternating-field components are disposed to at least partially coincide with the magnetic write pole. The one or more alternating-field components are configured to provide an alternating magnetic field having a microwave frequency and an orientation that is at least partially transverse to the magnetic write field.

14 Claims, 8 Drawing Sheets

US 8,422,159 B2

MICROWAVE-ASSISTED MAGNETIC RECORDING WITH COLLOCATED MICROWAVE AND WRITE FIELDS

BACKGROUND

Persistent efforts have been made to increase the data density of magnetic recording, including designs that exhibit better control and reliability in relation to magnetic fields.

SUMMARY

Methods and devices are provided for microwave-assisted magnetic recording with collocated microwave and write fields. An illustrative device includes a magnetic write pole and one or more alternating-field components. The magnetic write pole is configured for providing a magnetic write field. The one or more alternating-field components are disposed to at least partially coincide with the magnetic write pole. The one or more alternating-field components are configured to provide an alternating magnetic field having a microwave frequency and an orientation that is at least partially transverse to the magnetic write field.

The features described above are illustrative only rather and do not define limitations on various embodiments. Other features and benefits that characterize various embodiments will be apparent from the following detailed description, the associated drawings, and the other disclosure herein.

DETAILED DESCRIPTION

Figure 1:
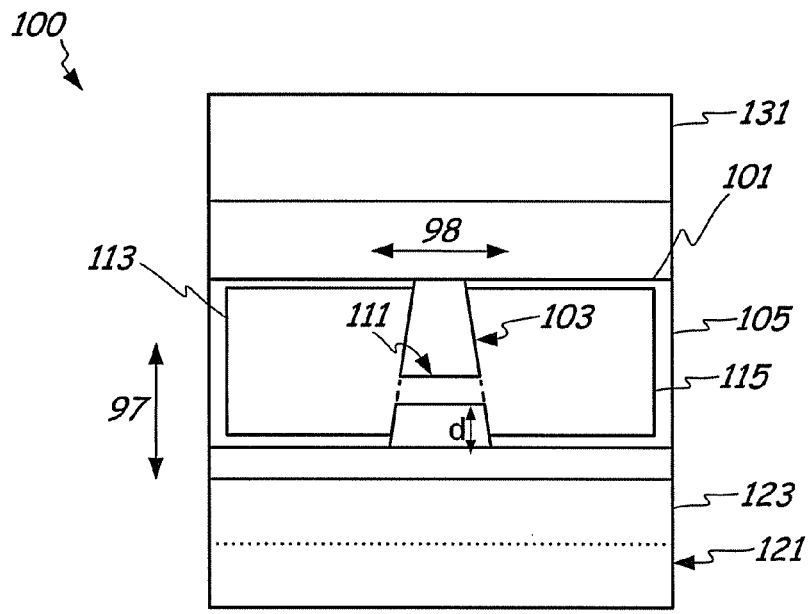
FIG. 1 depicts a simplified top or air bearing surface plan view of a magnetic recording head, in accordance with an illustrative embodiment.

As an illustrative embodiment, FIG. 1 depicts a simplified, top or air bearing surface plan view of magnetic recording head 100 that uses microwave-assisted magnetic recording (MAMR). Use of the descriptive term "top" here is arbitrarily chosen for illustrative simplicity in this example, and is in no way limiting. Magnetic recording head 100 may be used for writing and reading data stored on a magnetic medium, including writing data using assisted magnetic recording, such as in disc drives and other data storage devices, for example. Magnetic recording head 100 includes magnetic write pole 101, pole tip 103, magnetic return shield 121, reader shield 131, wire 111, and leads 113 and 115 in this illustrative embodiment. Magnetic write pole 101 is configured for providing a perpendicular magnetic write field, such as may be controllably provided to write data to a perpendicular recording magnetic medium. Magnetic recording head 100 is enabled to provide new advantages in microwave-assisted magnetic recording, as is further explained below.

Pole tip 103 is disposed at the distal end of magnetic write pole 101 and can have a trapezoidal shape as seen in this view, and is intersected by wire 111. Wire 111 passes through a conforming gap in the air bearing surface of magnetic write pole 101, such that wire 111 passes between and connects leads 113 and 115, in this example. Conductive leads 113, 115 are therefore positioned adjacent to the magnetic write pole 101 on opposing lateral sides thereof, in this illustrative embodiment. Wire 111 and leads 113, 115 are electrically conductive, and may be composed of a material such as copper or gold, for example, while magnetic write pole 101 may be composed of magnetic pole material, such as an iron-nickel alloy in one illustrative embodiment, while any other type of magnetic head material may also be used.

Leads 113 and 115 may be connected to an electrical circuit that may be controlled such that an alternating current is passed through lead 113, wire 111, and lead 115, for example. The alternating current passing through wire 111 and leads 113, 115 may thereby induce alternating magnetic fields, details of which are discussed further below. Because wire 111 is configured to induce an alternating magnetic field, it may be referred to as an alternating-field component, according to various illustrative examples. Magnetic return shield 121 is depicted with front shield 123, which is better seen in and described with reference to FIG. 2.

Reference line "d" in FIG. 1 indicates the distance between wire 111 and a space just beyond the edge of pole tip 103 corresponding to a longitudinal position approximately where the magnetic write field is maximum, as is further discussed below. Reference line 97 indicates a longitude direction across magnetic recording head 100, and reference line 98 indicates a latitude direction across magnetic recording head 100. The longitude direction may also be referred to as the along-track direction, while the latitude direction may also be referred to as the cross-track direction, a reference to being generally in-line with adjacent data tracks on an adjacent recording medium (in the case of the longitudinal/along-track axis), or generally perpendicular to the adjacent data tracks (in the case of the latitudinal/cross-track axis). Magnetic write pole 101 and magnetic return shield 121 have overlapping latitudinal positions, such that along-track lines parallel to longitudinal reference line 97 may coincide with both of them, but they are longitudinally separated and their longitudinal positions do not coincide, such that no cross-track line parallel to latitudinal reference line 98 would coincide with both of them. Wire 111 and leads 113, 115 are disposed to coincide with the latitudinal position of magnetic write pole 101, both by wire 111 directly intersecting the position of magnetic write pole 101, as well as by leads 113, 115 being positioned latitudinally adjacent to and not longitudinally displaced from magnetic write pole 101, in this illustrative embodiment. In other embodiments, alternating-field components may be either directly collocated with and/or latitudinally adjacent to the position of the write pole, for example.

Figure 2:
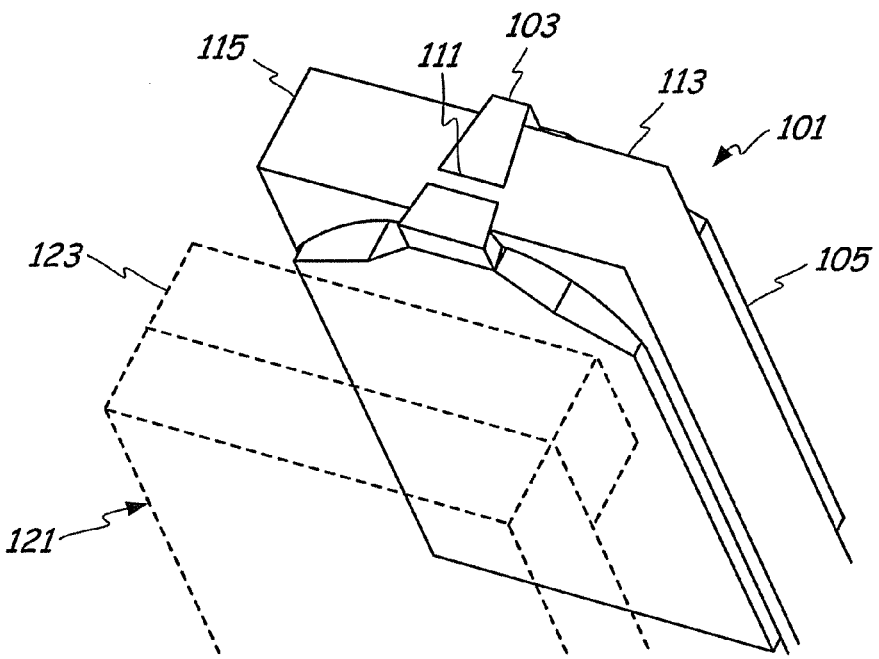
FIG. 2 depicts a simplified cutaway perspective view of a magnetic recording head, in accordance with an illustrative embodiment.

FIG. 2 depicts write pole 101 in a simplified perspective view, showing yoke 105 with pole tip 103 disposed at the distal end of yoke 105. Write pole 101 also has leads 113 and 115 extending along both lateral sides of write pole 101, with leads 113 and 115 both connecting to the narrower wire 111 that runs through a conforming gap in the pole tip 103. Magnetic return shield 121 is depicted in outline, positioned proximate to magnetic write pole 101, with front shield 123 extending toward pole tip 103.

Figure 3:
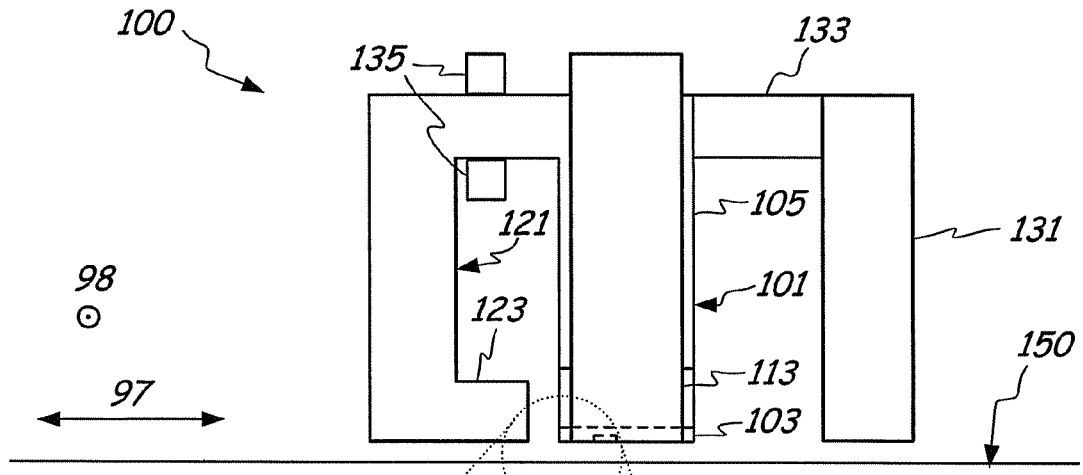
FIG. 3 depicts a simplified side plan view and exploded section view of a magnetic recording head and adjacent magnetic recording medium surface, in accordance with an illustrative embodiment.
Figure 3:
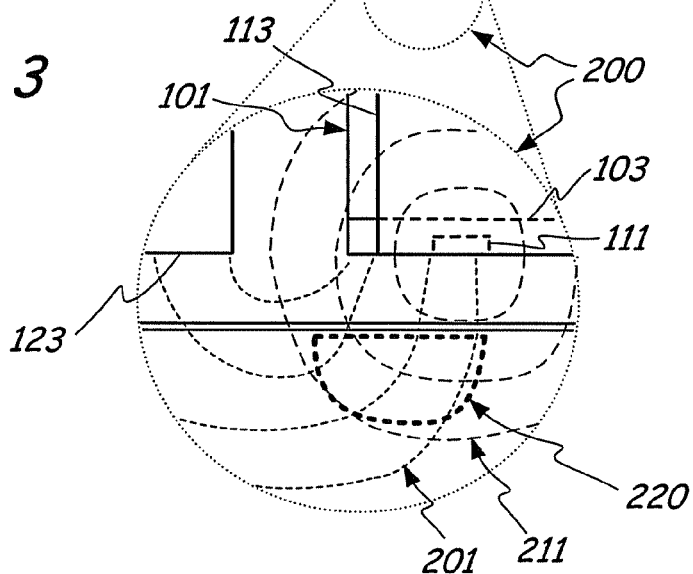

FIG. 3 depicts a simplified side plan view of magnetic recording head 100 from FIG. 1, including side views of magnetic write pole 101, lead 113, magnetic return shield 121, front shield 123, and reader shield 131, all of which are suspended from a base 133. Reader shield 131 may be part of a larger reader structure, including a reader and additional reader shields, which are not depicted herein. Magnetic write pole 101 includes yoke 105 and pole tip 103 suspended at the distal end of yoke 105. FIG. 3 shows front shield 123 extended from magnetic return shield 121 toward magnetic write pole 101. Write coils 135 are positioned around base 133 between magnetic write pole 101 and magnetic return shield 121, in this illustrative embodiment. Write coils 135 contribute to providing a data-encoded magnetic field 201 between magnetic write pole 101 and magnetic return shield 121, including through the volume around the gap between magnetic write pole 101 and front shield 123, and through a magnetic recording medium 150 that may be positioned in that volume, as illustratively depicted in close-up view 200. Magnetic recording medium 150 may include a variety of different layers (not shown), illustratively including a magnetic recording layer, a substrate layer on which the magnetic recording layer is disposed, a laminate layer disposed on the magnetic recording layer, and/or other layers in different embodiments.

In the view of FIG. 3, reference line 97 again indicates the longitudinal direction, while reference line 98 is depicted as a circle, indicating that the latitudinal direction is oriented perpendicular to and into and out of the page, in this view. Wire 111 and the other lead 115 are obscured by lead 113 in this view, while a left-right mirror image of FIG. 3 would show lead 115 in the corresponding position, obscuring the view of wire 111 and lead 113. Leads 113 and 115 extend along yoke 105 adjacent to magnetic write pole 101. An alternating magnetic field 211 may be induced around wire 111, as illustratively depicted in close-up view 200.

As shown in FIGS. 1 and 3, instead of a microwave field generating element being longitudinally separated from magnetic write pole 101, wire 111 is instead collocated with magnetic write pole 101, allowing both the magnetic write field and the microwave field to be emanated from generally the same position on magnetic recording head 100. Wire 111 therefore acts as an alternating-field component configured for providing a microwave-frequency oscillating magnetic field oriented at a substantially transverse or orthogonal angle to the perpendicular magnetic write field provided through pole tip 103, and in which wire 111 is positioned intersecting the air bearing surface of the magnetic write pole 101. Since wire 111 is much narrower than leads 113 and 115, the alternating current density is much greater in wire 111 and is therefore concentrated at the position of pole tip 103, so that the microwave field 211 is collocated with the magnetic write field 201.

This allows both microwave field 211 and magnetic write field 201 to work together most effectively, and allows the gradients and areas of effective strength of both microwave field 211 and magnetic write field 201 generally to coincide in the magnetic recording medium 150. The spin thermal gradient may be tuned to add to the write field gradient. The gradient of the microwave field 211 works with the gradient of the magnetic write field 201 to reduce transition width, jitter, and noise. This also uses the power applied to both fields most efficiently, for example as opposed to a microwave field sourced at a longitudinal or along-stream displacement from the magnetic write pole, in which case only a small amount of the field strength would be available at the effective data writing position of the magnetic write field, and much higher power would need to be consumed for the microwave field. This more efficient operation, with less power projected into the magnetic recording medium 150, also results in less waste heat generated in magnetic medium 150 and therefore a higher threshold against degrading adjacent data bits. Magnetic write pole 101 also acts as a heat sink for wire 111, and may be laminated in this embodiment. This enables a higher current density through wire 111 than would be feasible without that heat sink.

When magnetic recording head 100 is used adjacent to a magnetic recording medium 150 to write data to the medium, the alternating magnetic field 211 may be generated around wire 111, as described by Ampère's Law, while the magnetic write field 201 is provided through the write magnetic pole 101. Both the magnetic write field 201 and the alternating magnetic field 211 intersect the magnetic medium, but at different orientations that may be at least partially transverse or orthogonal to each other. The magnetic write field 201 passes generally between the magnetic write pole 101 and the front shield 123 and with a substantial component that is perpendicular to the surface of the magnetic recording medium in the vicinity of magnetic write pole 101, while the alternating magnetic field 211 is oriented generally cylindrically around wire 111 and generally tangential to the surface of the magnetic recording medium 150. Wire 111 may thereby serve as an alternating-field component disposed to at least partially coincide with the longitudinal position of the magnetic write pole 101, such that wire 111 is configured to provide an alternating magnetic field having a microwave frequency and an orientation that is at least partially transverse or orthogonal to the perpendicular magnetic write field, in accordance with one illustrative embodiment.

The alternating magnetic field 211 may exert an alternating spin torque on the magnetization of each of the proximate bit areas of the magnetic medium 150, and may exert this spin torque with a frequency that is at or near a resonant frequency of the magnetization of the bit areas, causing the magnetization of the magnetic domains in the affected data bit areas to precess. This resonance-inducing frequency may correspond to a microwave wavelength, thereby providing a microwave-frequency oscillating magnetic field. This may also be referred to as a microwave field.

The microwave-frequency alternating magnetic field 211 may thereby reduce the effective magnetic coercivity of the affected area of a targeted bit area 220 on the magnetic medium 150. In particular, by exerting a spin torque on the magnetization of the magnetic domains in the affected bit areas, the alternating magnetic field 211 reduces the coercivity by temporarily reducing the threshold of additional spin torque that must be applied by the magnetic write field 201 to flip the magnetization of that bit area, in this illustrative embodiment.

The targeted bit area 220 is where an area of effective field strength of the alternating magnetic field 211 coincides with an area of effective field strength of the magnetic write field 201, such that the microwave field 211 temporarily reduces the coercivity to within a threshold for the magnetic write field 201 to be able effectively to reverse the magnetization of selected data bit areas such as representative targeted bit area 220. This microwave-assisted magnetic recording therefore allows a magnetic medium to be selected that has a coercivity high enough that the magnetic write field 201 alone would be unable to write over the magnetization of the data bits. That very high coercivity contributes to allowing data bits of a smaller size and higher areal density while still remaining stable against data loss by random thermal degradation. As both of the magnetic fields are applied to controllably reverse the magnetizations of magnetic bit areas along a data track, they enable the data encoded in magnetic write field 201 to be written to the magnetic recording medium 150. That is, the coercivity of magnetic recording medium 150 is high enough such that the magnetization of magnetic recording medium 150 is not altered by magnetic write field 201 except within targeted magnetic bit area 220, because the coercivity there has been temporarily reduced by the excitation of the magnetization induced by microwave field 211.

Within a magnetic bit area 220 defined by a given area of overlap between magnetic write field 201 and microwave field 211 within magnetic recording medium 150, the magnetic field strength of both microwave field 211 and the magnetic write field 201 may be high enough that magnetic write field 201 is enabled to switch the magnetization of the section of magnetic recording medium 150 within that magnetic bit area 220. That magnetization may be controllably directed to write either an up or down magnetic bit, in an illustrative example of microwave-assisted magnetic recording in the present embodiment.

Figure 3B:
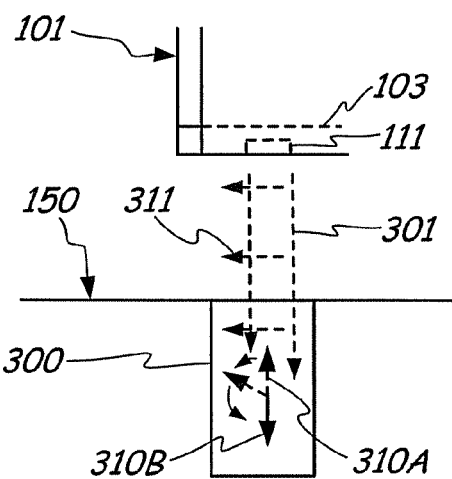
FIG. 3B depicts a simplified side plan cutaway detail view of a magnetic pole tip and adjacent magnetic recording medium surface, in accordance with an illustrative embodiment.

Illustrative advantages of this microwave-assisted magnetic recording process can be considered in terms of the orientations of the spin torques provided by both the microwave field and the magnetic write field. As shown in FIG. 3B, at a particular instance in time, pole tip 103 is projecting magnetic write field 301 into a representative bit area 300 in a data track on magnetic recording medium 150, while wire 111 is projecting microwave field 311 into bit area 300. Microwave field 311 and write field 301 are substantially orthogonal to each other, or at least have substantial components thereof that when decomposed are orthogonal to each other. Bit area 300 initially, prior to the present write action by write pole 101, has an up-oriented magnetization 310A. The initial spin torque of write field 301 on magnetization 310A is proportional to the cross product between the two, which is initially close to zero. Write field 301 would have to overcome that initial very small spin torque by itself, as well as the bias of magnetization 310A to remain oriented in line with the easy axis of bit area 300, leading to significant delay in the time required for the write operation, if the microwave assisted recording were not used.

Instead, the microwave field 311 induced by the alternating current through wire 111 is also projected into bit area 300, and has an orientation substantially orthogonal to the initial magnetization 310A of the bit area, so that its cross product with the magnetization is approximately proportional to the full magnitude of the magnetic field strength of microwave field 311 at that instance in time. The easy axes and magnetizations of the bit areas are inherently designed to be axially aligned with the write field 301, so that by the microwave field 311 being substantially orthogonal to write field 301, it is also substantially orthogonal to the initial magnetizations of the bit areas, and therefore inherently designed to provide a more efficient initial torque to the magnetizations of the bit areas. Microwave field 311 therefore provides a far more efficient initial torque to the initial magnetization 310A of bit area 300 than write field 301 is capable of, while that initially torqued magnetization is then much more efficiently further torqued by write field 301 into its final, written magnetization 310B, with a down orientation.

The action of microwave field 311, considered in further detail, is also affected by the changes in strength and orientation of microwave field 311 due to its source from an alternating current. Microwave field 311 may be oriented opposite to the orientation depicted in FIG. 3B when it projects onto a given bit area, and may be at different levels of field strength between its maximum in one orientation and its state between orientations. The net effect of microwave field 311 on any particular bit area is defined by an integral of the changing microwave field as the field passes through the bit area. However, the net effect of microwave field 311, regardless of its phase during interaction with a given bit area, may still always be to provide a component of initial torque orthogonal to the magnetization of bit area 300, to provide for a more efficient and faster write process in cooperation with write field 301.

In the event that the bit being written to a bit area coincides with the magnetization that bit area already has, microwave field 311 and write field 301 may optionally still be applied to the bit area, in which case the initial torque on the bit area's magnetization by microwave field 311 is followed up by write field 301 torqueing the magnetization back to its prior state.

Magnetic bit area 220 may therefore be written to, i.e. have its magnetization selectably, reliably, and permanently changed between either up or down, by the process of microwave-assisted magnetic recording as illustratively depicted in FIG. 3. Magnetic bit area 220 is smaller than a magnetic bit that may be written on an otherwise analogous magnetic medium having a low enough coercivity to be written to with a magnetic field alone, without microwave-assisted magnetic recording. For a magnetic bit to be written reliably, it must have a high enough product of size and coercivity to resist being randomly re-magnetized by random thermal fluctuations. The stability of the magnetization of a magnetic bit against thermal disturbances can be modeled as a threshold value of $K_U V/kT$, where $K_U$ is magnetic anisotropy energy density, V is the volume of a magnetic grain, k is Boltzmann's constant, and T is temperature, where a magnetic bit may include several magnetic grains. In an illustrative embodiment, a value for $K_U V/kT$ of at least approximately 60 (with no units, because x is a dimensionless ratio) is used as a design standard for maintaining the magnetization of a magnetic bit.

Therefore, for a magnetic recording layer of a given magnetic anisotropy energy density, there is a minimum size for which a stable magnetic bit can be written, where smaller magnetic bits would have an unacceptably substantial susceptibility to random loss of the written magnetization. The microwave-assisted magnetic recording of the embodiments discussed herein enable the usage of higher coercivity recording medium and smaller bit areas than can be achieved through unassisted magnetic recording, or through microwave-assisted recording in which the microwave-field component is latitudinally displaced from the magnetic write pole rather than collocated with it, as an illustrative example.

As an example, in the illustrative embodiment, hard magnetic layer 153 may have a coercivity of between approximately 25 and 100 kilooersteds in various embodiments, and may illustratively have a coercivity in the approximate range of 15 to 20 kilooersteds in the present example. The magnetic write pole 101 may provide a saturation magnetization ($4\pi M_s$) of greater than 2 tesla, and may illustratively be 2.4 tesla in this example. The size of the corresponding magnetic bit area may be in the general range of approximately 50 nanometers across in the cross-track direction, as an illustrative example, and may be in the general range of approximately 10 nanometers across in the down-track i.e. along-track direction in various embodiments, though other dimensions greater and lesser than these may be used in other embodiments. In different embodiments the magnetic recording layer may also have other values of coercivity $H_K$ from less than 15 kilooersteds to more than 20 kilooersteds (where $H_K$ is equal to $2K_U/M_s$).

The microwave-assisted magnetic recording of the present embodiment temporarily lowers the coercivity of the area of magnetic recording medium 150 within the effective overlap of the magnetic write field 201 and the microwave field 211 to enable magnetization of a targeted magnetic bit area 220, which then returns to the higher equilibrium coercivity once the microwave field 211 of the write process disperses, which it does very quickly, leaving magnetic bit area 220 with a stable value for $K_UV/kT$ of with an average value of approximately 60 among a distribution of magnetic grain sizes, and with a minimum value for individual grains in the general range of approximately 40, in an illustrative embodiment. The collocated microwave-assisted magnetic recording of the present embodiment therefore makes possible smaller magnetic bits and higher data density than would be possible without microwave-assisted magnetic recording.

Figure 4:
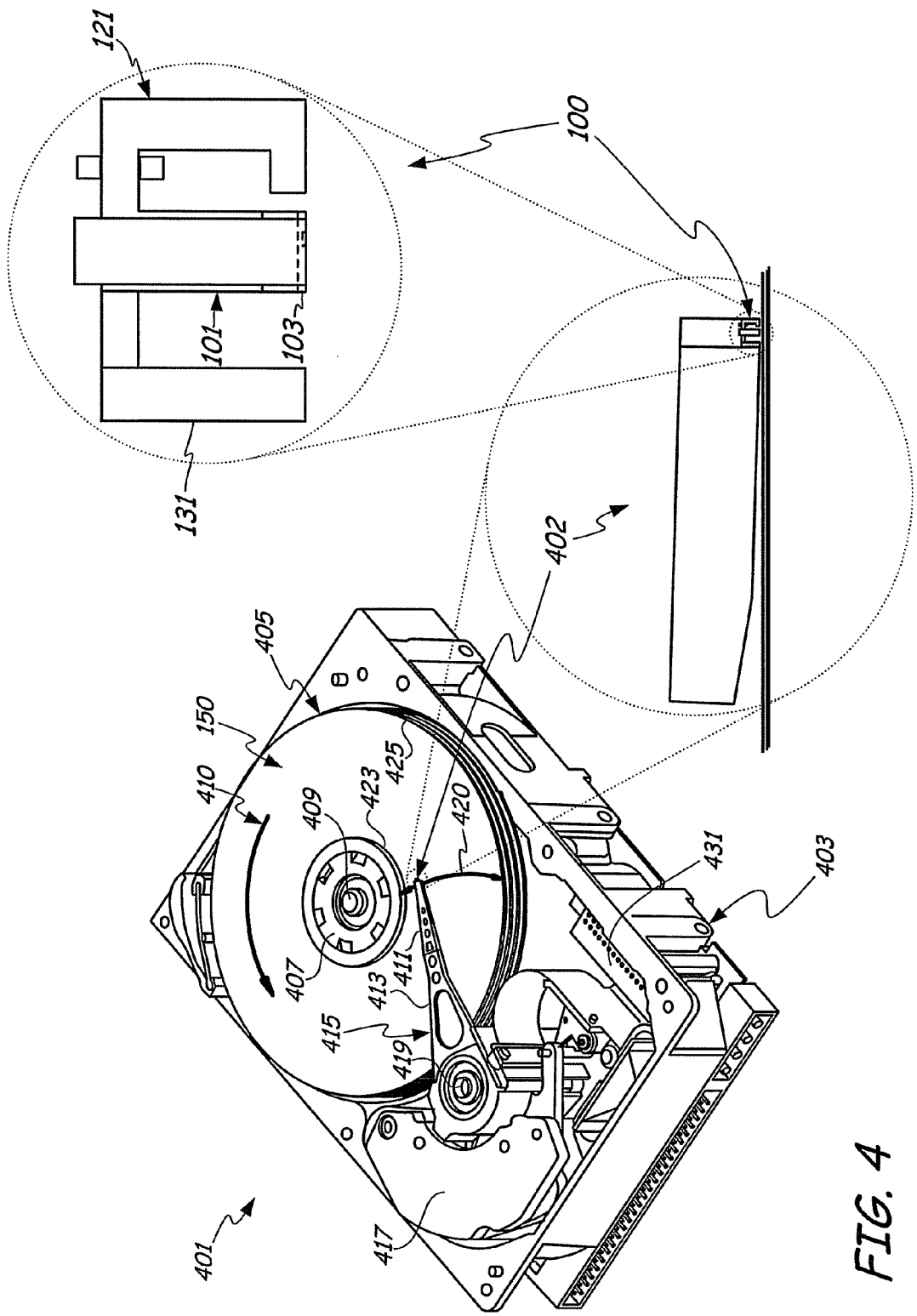
FIG. 4 depicts a simplified perspective view of a representative data storage system in which a microwave-assisted magnetic recording head may be incorporated, and exploded side plan section views of a slider and a magnetic recording head incorporated in the data storage system, in accordance with an illustrative embodiment.

FIG. 4 depicts a simplified perspective view of a representative data storage system 401 as an illustrative example of a system in which microwave-assisted magnetic recording head 100 may be incorporated, in accordance with one illustrative embodiment. Data storage system 401 includes a housing with a base 403 and a top cover (not shown). Data storage system 401 further includes a disc pack 405, which is mounted on a spindle motor (not shown) by a disc clamp 407. Disc pack 405 includes a plurality of individual discs, which are mounted for co-rotation in rotational direction 410 about central axis 409, and which may serve as a magnetic recording medium such as magnetic recording medium 150 as referred to in FIG. 3, in accordance with one illustrative embodiment. Each disc surface has an associated slider 402 which is mounted to data storage system 401 for communication with the disc surface.

Sliders 402 may each include a microwave-assisted magnetic recording head 100 such as the illustrative examples depicted and discussed herein. In the example shown in FIG. 4, sliders 402 are supported by suspension apparatus that includes suspensions 411 which are attached to track accessing arms 413 of an actuator 415. The heat-assisted magnetic recording heads disposed on the sliders 402 may thereby be disposed on respective suspension apparatus including suspensions 411 and positionable thereby proximate to the magnetic recording medium of each of the discs in disc pack 405, in this illustrative embodiment.

The actuator shown in FIG. 4 is of the type known as a rotary moving coil actuator and includes a voice coil motor (VCM), shown generally at 417. Voice coil motor 417 is driven by servo electronics (not shown in FIG. 4) through a communicative connection through connector 431, based on signals generated by sliders 402 and a host computing system (not shown). Voice coil motor 417 rotates actuator 415 with its attached sliders 402 about a pivot shaft 419 to position sliders 402 over desired data tracks along an arcuate path 420 between a disc inner diameter 423 and a disc outer diameter 425. Slider 402 may thereby be positioned proximate to magnetic recording medium 150 such that microwave-assisted magnetic recording head 100 is in close proximity to magnetic recording medium 150, which may be in single digit nanometers, or may be approximately one nanometer or smaller, in various illustrative examples, though other distances may also be involved in various embodiments and at various times during the operation of the system. Magnetic recording head 100 is thereby configured for providing the microwave-frequency oscillating magnetic field to a position on the magnetic recording medium that substantially overlaps the perpendicular magnetic write field.

Data storage system 401 incorporating magnetic recording head 100 or various different embodiments thereof may illustratively be incorporated in a handheld, notebook, or laptop computer, media player, server farm, data center, or other device or system (not pictured in FIG. 4), for example.

Figure 5:
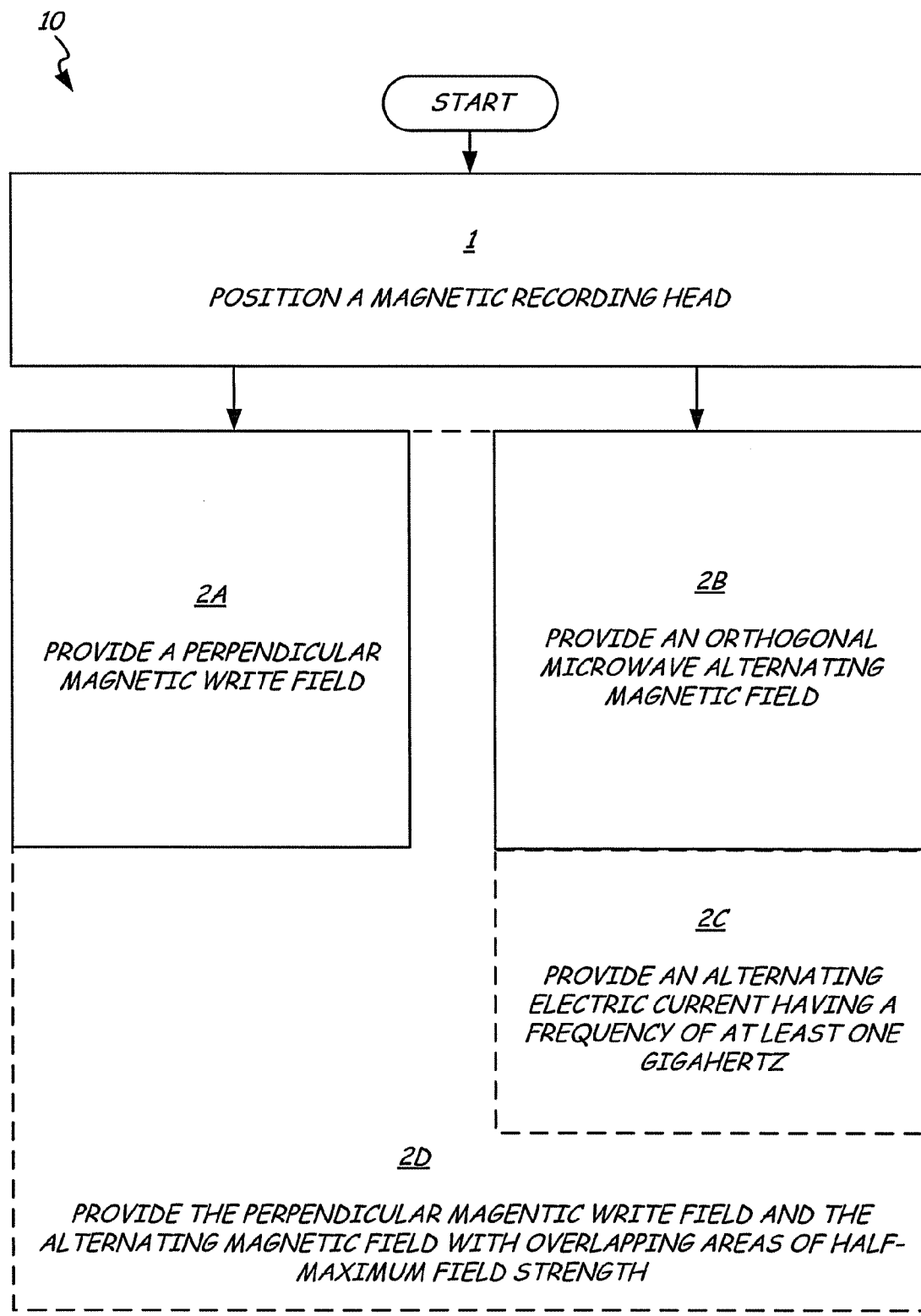
FIG. 5 depicts a flowchart for a method for microwave-assisted magnetic recording, in accordance with an illustrative embodiment.

FIG. 5 depicts a flowchart for a process 10 for microwave-assisted magnetic recording, in accordance with an illustrative embodiment largely along the lines of how microwave-assisted magnetic recording may be performed with reference to the devices discussed for the previous figures. Process 10 includes step 1, of positioning a magnetic recording head proximate to and in motion relative to a magnetic recording medium, such that the direction of the relative motion of the magnetic recording head defines an along-track direction; step 2A, of providing a perpendicular magnetic write field between a magnetic write pole disposed on the magnetic recording head, and a magnetic return shield disposed on the magnetic recording head, that is enabled for perpendicular magnetic writing to the magnetic recording medium; and step 2B, of providing an alternating magnetic field from an alternating-field element, such as wire 111, that at least partially intersects the magnetic recording head, wherein the alternating magnetic field has a microwave frequency and has an orientation component that is orthogonal to the perpendicular magnetic write field. Steps 2A and 2B are depicted in parallel because they may be performed at the same time or at overlapping times, so that the write field and the alternating magnetic field are both imposed on an adjacent media surface at the same time or about the same time, in this illustrative embodiment.

Step 2B of process 10 may optionally also include the steps indicated in dashed lines, including step 2C, of providing an alternating electric current having a frequency of at least one gigahertz through the alternating-field element to provide the alternating magnetic field, while the particular frequency used may be optimized for the characteristics of the magnetic recording medium; and/or step 2D, of providing the perpendicular magnetic write field and providing the alternating magnetic field with overlapping areas of half-maximum field strength on the magnetic recording medium. This is an example of quantitatively defining the generally high area of overlap between the central, effective-strength portions of both the magnetic write field and the microwave field, resulting from the collocation of the pole tip 103 and the wire 111, thereby providing particularly efficient and effective microwave-assisted magnetic recording.

Illustrative advantages of the collocation of pole tip 103 and wire 111 can be quantitatively considered in terms of the time required for magnetization spin switching and subsequent spin cooling in a bit area. The spin cooling time $\tau$ for the spin in a bit area to settle after the bit area is written to, may be approximately equal to $1/\alpha\gamma(H_K - H_w)$, where $\alpha$ is the Gilbert damping parameter (which indicates spin transfer efficiency), $\gamma$ is the gyromagnetic ratio, $H_K$ is the anisotropy magnetic field of the bit area, and $H_w$ is the write field. General estimates for these values in one illustrative embodiment may be, for example, 0.005 for $\alpha$, $1.8*10^7$ for $\gamma$, 15,000 for $H_K$, and 10,000 for $H_w$, which gives a value of approximately 2 nanoseconds for the magnetization switching time. In this illustrative embodiment, the slider 402 with attached magnetic recording head 100 may have a relative speed with reference to the adjacent magnetic recording surface of around 25 meters per second. At that speed, the relative displacement between pole tip 103 and the adjacent magnetic media surface 150 during the time $\tau$ is approximately 50 nanometers, in this illustrative embodiment. 50 nanometers is approximately the distance represented by reference line "d" in FIG. 1, the distance between wire 111 and a space just beyond the edge of pole tip 103 corresponding to a longitudinal position approximately where the magnetic write field is maximum. As this indicates, the spin excitation in the bit area caused by the microwave field 211 provided by wire 111 is approximately just enough for the spin to remain excited while the bit area travels through the maximum strength of magnetic write field 201, while microwave field 211 does not need to be provided with the higher strength and power, and resulting inefficiency, that would be required to be effective from a more distant position than the collocated position of wire 111.

All of these values are given approximately in the particular instance of one illustrative embodiment, and many other arrangements with higher or lower values for any of these variables may be used in other embodiments. Additionally, while the microwave field 211 provided by wire 111 intersects magnetic recording surface 150 with its greatest strength directly adjacent to wire 111, microwave field 211 also extends to some degree across magnetic recording surface 150 in the direction of front shield 123, so the spin cooling of a bit area from the excitation of the microwave field 211 would not necessarily begin immediately after wire 111 was directly across from that bit area. Rather, this discussion gives a generalized description of the efficiency resulting from the collocation of wire 111 with pole tip 103, and the particular field strengths, materials, and dimensions could be optimized in different ways for different embodiments in accordance with these principles.

Magnetic recording heads such as those discussed herein may be manufactured in a variety of different ways. As some illustrative examples, a deposition process may be used to deposit layers for the write pole 101 with layers for the pole tip 103 and yoke 105, and the wire 111, and ion milling may be used to pattern the write pole 101. Leads 113 and 115 may then be created by depositing a seed and mask, plating copper or other lead material, stripping the mask, milling the seed, and depositing an insulating material such as alumina. Chemical-mechanical planarization may then be applied to write pole 101, and additional processing steps undertaken for magnetic recording head 100 or similar magnetic recording head. These processing steps are merely presented as illustrative examples, and any other effective processing steps may also be used.

Figure 6:
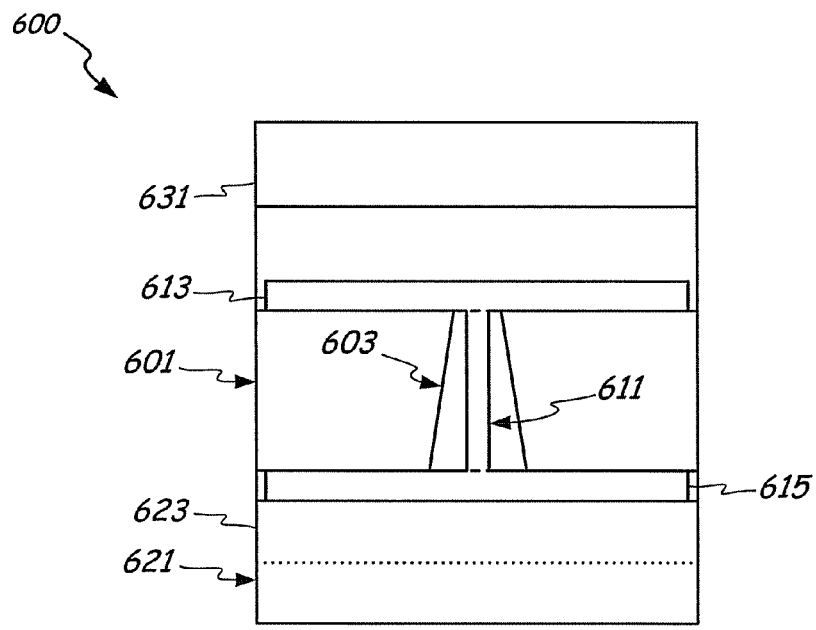
FIG. 6 depicts a simplified top or air bearing surface plan view of a magnetic recording head, in accordance with an illustrative embodiment.

FIG. 6 depicts a simplified air bearing surface plan view of a magnetic recording head 600 in accordance with another illustrative embodiment. Magnetic recording head 600 is analogous in some ways to magnetic recording head 100 of the prior figures, while featuring a different arrangement of the conductive alternating field components. Magnetic recording head 600 includes magnetic write pole 601, pole tip 603, magnetic return shield 621, reader shield 631, wire 611, and leads 613 and 615. In this illustrative embodiment, leads 613 and 615 are on opposite along-track sides of write pole 601, with wire passing between leads 613, 615 in an along-track direction through pole tip 603. Lead 613 occupies a position between pole tip 603 and reader shield 631, while lead 615 occupies the space between pole tip 603 and front shield 623. The conductive leads 613, 615 are therefore positioned adjacent to the magnetic write pole 601 on opposing longitudinal sides thereof, in this illustrative embodiment.

Figure 7:
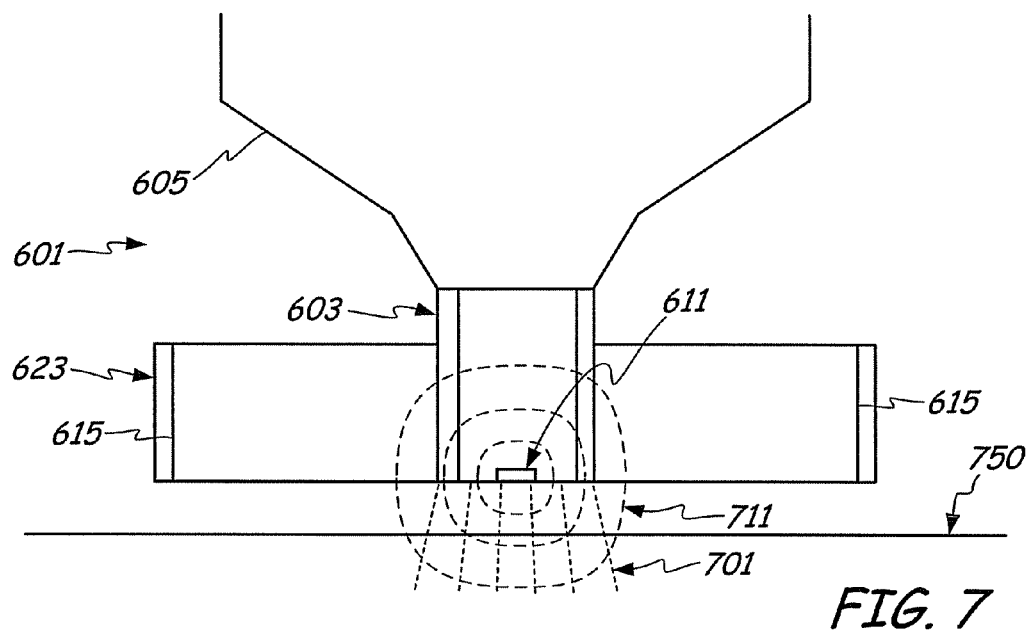
FIG. 7 depicts a simplified cutaway forward plan view of a portion of a magnetic recording head and adjacent magnetic recording medium surface, in accordance with an illustrative embodiment.

The embodiment of magnetic recording head 600 of FIG. 6 is further illustrated in FIG. 7 in an along-track perspective, viewing the distal section of write pole 601 and front shield 623 from a viewpoint behind lead 613 (not shown in FIG. 7). Leads 613 and 615 and wire 611 are part of a circuit through which a high-frequency alternating current is applied. Wire 611 is thinner than leads 613 and 615 and has a smaller cross-sectional area, and has a higher current density. The alternating current through wire 611 induces a high-frequency alternating magnetic field 711 that is oriented generally cylindrically around wire 611. Write pole 601 includes yoke 605 which supports pole tip 603 at the distal end thereof. Pole tip 603 provides magnetic write field 701 across a gap with magnetic return shield 621.

Magnetic write field 701 and alternating magnetic field 711 are both projected at orientations substantially orthogonal to each other, or at least at significant angles relative to each other such that significant components thereof are orthogonal to each other. Magnetic write field 701 and alternating magnetic field 711 are also both projected into the surface of magnetic recording medium 750, with the major incident portion of magnetic write field 701 projected at an orientation that is substantially perpendicular to the surface of magnetic recording medium 750, and with the major incident portion of alternating magnetic field 711 projected at an orientation that is substantially parallel to the surface of magnetic recording medium 750.

Compared with alternating magnetic field 211 of the embodiment of FIGS. 1 and 2, alternating magnetic field 711 is also disposed substantially orthogonal to the orientation of alternating magnetic field 211 relative to the magnetic recording head, namely in an along-track direction as opposed to a cross-track direction, while both of these illustrative alternating magnetic fields are still substantially orthogonal to the magnetic write field and substantially parallel to the surface of the magnetic recording medium in the region of effective field strength of the magnetic write field. The alternating magnetic field may be oriented either in a cross-track direction or an along-track direction and in either case, may provide the initial parallel magnetic spin torque that temporarily reduces the effective magnetic coercivity of the magnetic domains making up the bit areas in the magnetic recording medium, thereby assisting the effect of the magnetic write field on those bit areas. Providing the alternating magnetic field in either a cross-track, along-track, or some other orientation may be used for different purposes in different embodiments.

Figure 7B:
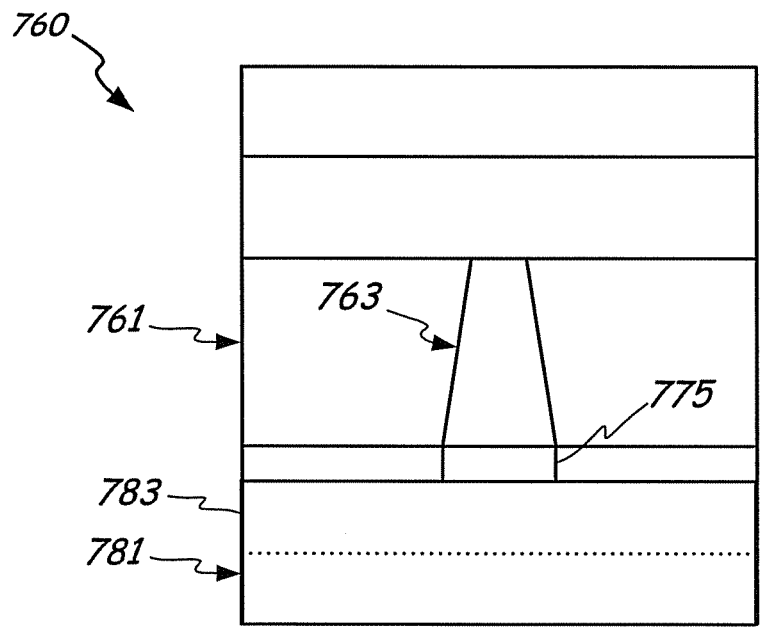
FIG. 7B depicts a simplified top or air bearing surface plan view of a magnetic recording head, in accordance with an illustrative embodiment.
Figure 7C:
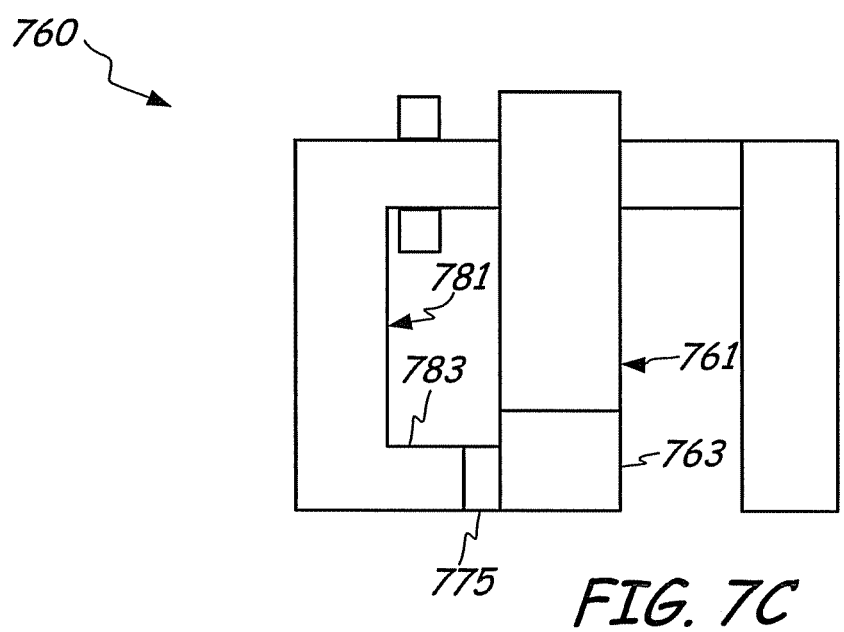
FIG. 7C depicts a simplified side plan view of a magnetic recording head, in accordance with an illustrative embodiment.

FIGS. 7B and 7C depict slider 760 in accordance with another illustrative embodiment, in which the alternating current passes directly through the magnetic write pole 761 and the front shield 783, for example. The gap between the pole tip 763 and front shield 783 may be filled with a conductive gap block 775 composed of a conductive material such as copper or gold, for example, and positioned to conduct alternating current between pole tip 763 and front shield 783. Write pole 761 and pole tip 763 may themselves act as one of the current leads, while the magnetic return shield 781, front shield 783 and conductive gap block 775 act as the other current lead, in this embodiment. Alumina or other insulating material may also be used around the conductive elements to provide electrical isolation outside the circuit path. The alternating current has a maximum current density in conductive gap block 775 in the area of its interface with the write pole tip 763, and it is at this peak current density that it provides an effective field strength for the corresponding lateral, alternating magnetic field to energize the intended bit area and facilitate the write process. The field strength of the alternating magnetic field decays rapidly with distance away from the area of conductive gap block 775 near its interface with write pole tip 763 and away from the intended bit area targeted for a particular write process, so that surrounding bit areas securely retain their magnetic states during a write to the intended bit area.

In another illustrative embodiment, a direct current instead of an alternating current may be provided through write pole 761, conductive gap block 775, and magnetic return shield 781. This may induce an Ampère magnetic field around write pole 761 and conductive gap block 775 that is constant in the frame of reference of slider 760 but alternating from low to high and back to low in the frame of reference of a bit area on an adjacent media surface as the bit area passes by the slider 760. This Ampère magnetic field may also superimpose with the magnetic write field as the write field reverses magnetization from writing one bit to the next. The DC-imposed Ampère field superimposed with the magnetization reversal of the write field may therefore generate an alternating magnetic field and induce precessional rotation in a bit area. In this embodiment as well as others, the pole tip, conductive gap block, return shield, and/or other components may therefore be configured to provide an alternating magnetic field and serve as alternating-field components by being configured to conduct either an alternating current or a direct current in combination with the write field.

Figure 8:
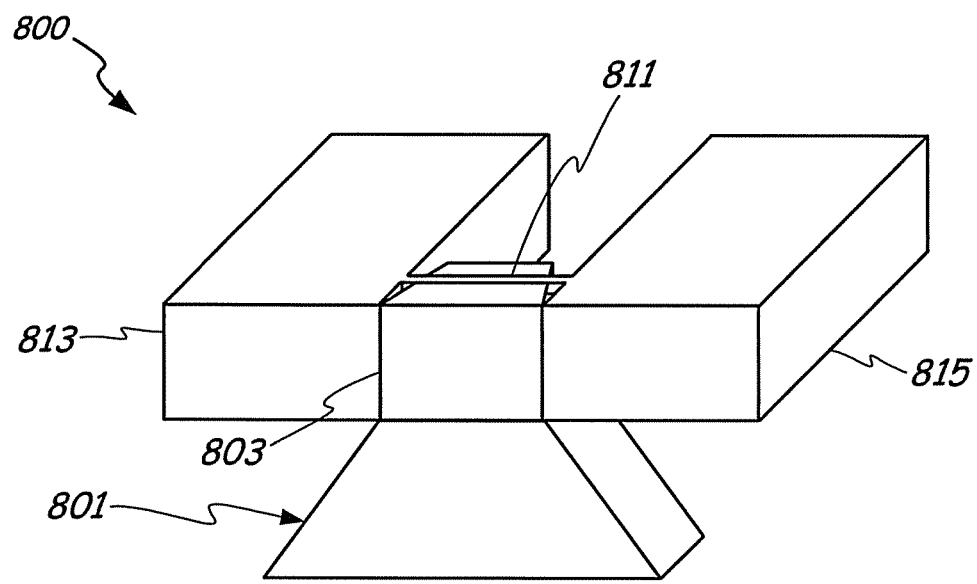
FIG. 8 depicts a simplified detail perspective view of a portion of a magnetic recording head, in accordance with an illustrative embodiment.
Figure 9:
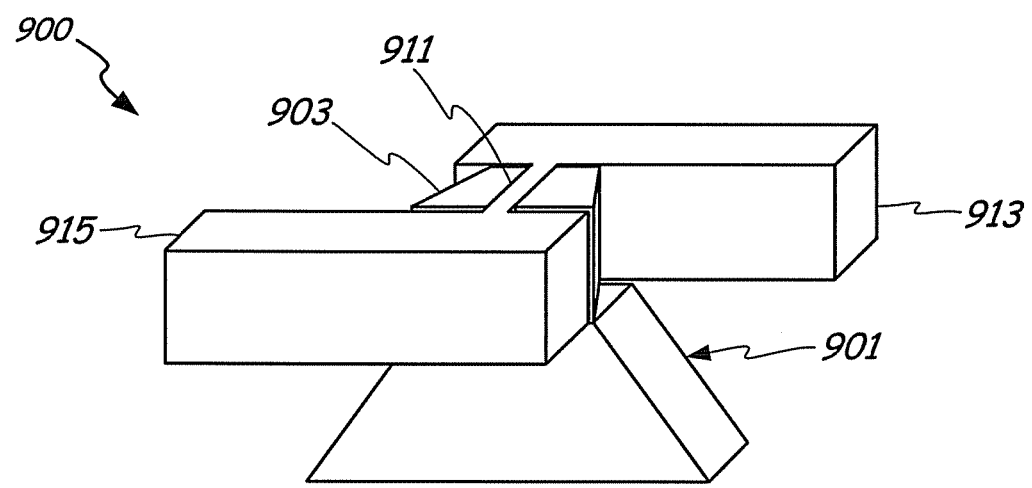
FIG. 9 depicts a simplified detail perspective view of a portion of a magnetic recording head, in accordance with an illustrative embodiment.

FIGS. 8 and 9 depict additional illustrative examples, depicting a close-up view of certain components in the vicinity of the pole tip, while omitting additional portions and components of a surrounding magnetic recording head. In the illustrative embodiment depicted in FIG. 8, leads 813, 815 may extend laterally adjacent to pole tip 803 on both lateral sides thereof, from circuit connections based at a longitudinal displacement from write pole 801. Wire 811, which provides the effective alternating magnetic field, still intersects and passes through pole tip 803, such that the alternating-field component (wire 811 in this example) still at least partially coincides with the along-track, i.e. longitudinal, position of the magnetic write pole 801, in that wire 811 is not longitudinally displaced from pole tip 803 and still provides the advantages of collocated microwave and write fields. In the additional illustrative embodiment of FIG. 9, leads 913 and 915 extend to longitudinally adjacent to pole tip 903 from mainly laterally displaced positions on either longitudinal side of pole tip 903, while wire 911 still passes through pole tip 903 such that wire 911 still coincides with the along-track, longitudinal position of write pole 903, even while contacts 913 and 915 are longitudinally displaced from pole tip 903. In still other embodiments, the conductive wire may be disposed adjacent to the magnetic write pole rather than directly through the surface of the write pole, for example.

Figure 10:
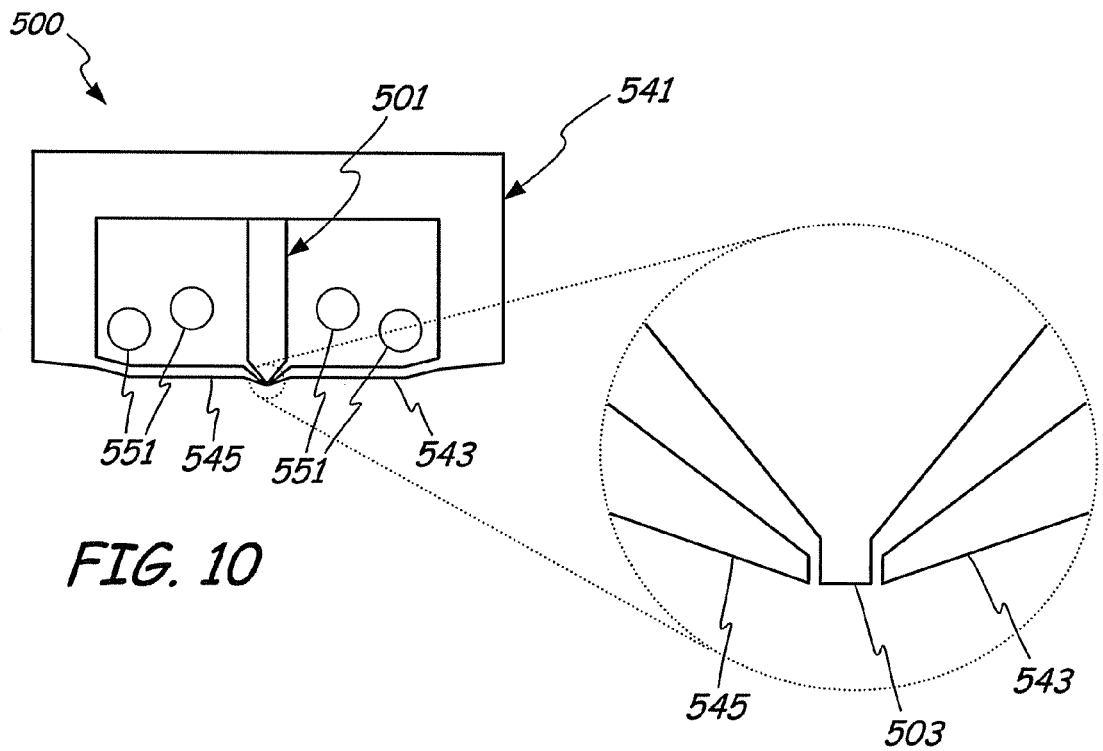
FIG. 10 depicts a simplified cutaway forward plan view and exploded detail section view of a portion of a magnetic recording head, in accordance with an illustrative embodiment.
Figure 11:
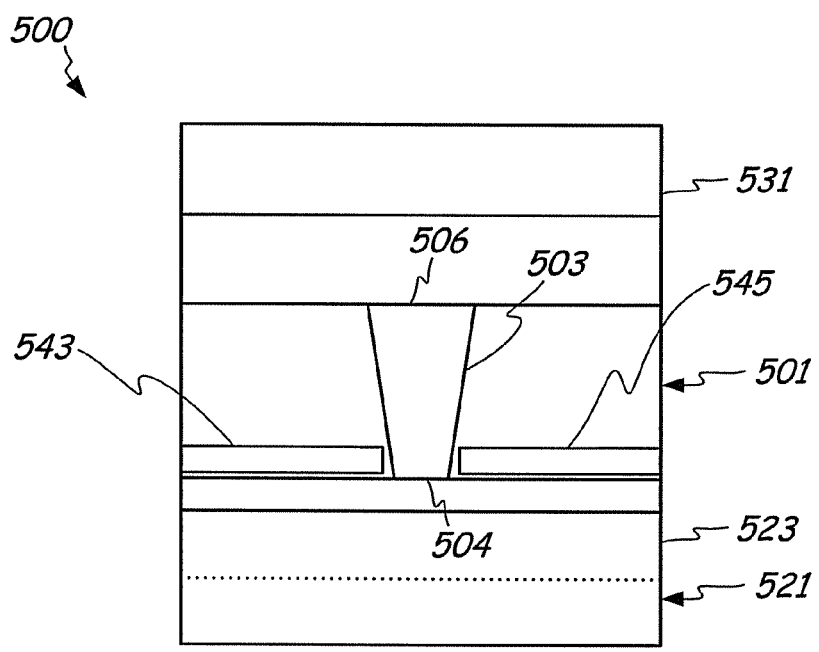
FIG. 11 depicts a simplified top or air bearing surface plan view of a magnetic recording head, in accordance with an illustrative embodiment.

FIGS. 10 and 11 depict an along-track cutaway plan view and an air bearing surface plan view, respectively, of a microwave-assisted magnetic recording head 500 in accordance with another illustrative embodiment that uses a soft magnetic element, including a magnetic ring instead of a conductive wire, as the alternating-field component. In particular, recording head 500 includes soft magnetic ring 541 that is energized by conductive coils 551 to which an alternating current is applied, inducing an alternating magnetic field in magnetic ring 541. Recording head also includes front shield 523, magnetic return shield 521, and reader shield 531, in this illustrative embodiment. Conductive coils 551 may be configured to run alternating currents with frequencies in the microwave range, such as greater than one gigahertz, for example. Magnetic ring 541 includes magnetic ring arms 543 and 545 that extend toward each other, while the ends of the magnetic ring arms remain separated from each other across a small gap that is occupied by the trailing edge 504 of pole tip 503 of write pole 501. Magnetic ring arms 543 and 545 are therefore positioned on opposing laterally displaced sides of the magnetic write pole 501. The magnetic field and the oscillations thereof induced in magnetic ring 541 pass through the vicinity of the gap defined between the ends of magnetic ring arms 543 and 545.

In this way, magnetic ring arms 543 and 545 may provide an alternating magnetic field that runs generally parallel to a local recording medium surface and is directly collocated, in this example also, with the magnetic write field provided by pole tip 503. The alternating magnetic field provided by magnetic ring 541 through ring arms 543, 545 therefore, in this example also, is provided with its area of greatest field strength incident on an adjacent magnetic recording medium substantially overlapping the area of greatest field strength of the generally orthogonal magnetic write field, such that the alternating field and write field, in this example also, work together to provide particularly efficient microwave-assisted magnetic recording.

The air bearing surface of pole tip 503, as shown in FIG. 11, in this illustrative embodiment has a trapezoidal shape, with its laterally elongated edges, i.e. leading edge 506 and trailing edge 504, parallel to each other, and trailing edge 504 shorter, i.e. laterally narrower, than leading edge 506. This allows the tips of magnetic ring arms 543, 545 to be spaced more closely together and to narrow the gap between them, to enhance the efficiency and precision of the positioning of the transverse, alternating magnetic field provided between the two and of its collocation with the magnetic write field, which itself is concentrated proximate to the position of trailing edge 504. The assisting alternating magnetic field provided by the alternating-field components, in the form of ring arms 543 and 545, also helps enable effective data writing even though the trailing edge 504 is relatively shorter compared with the dimensions of pole tip 503. While the alternating-field components including ring arms 543 and 545 are not directly collocated with pole tip 503 in this embodiment, they are separated from pole tip 503 only in a lateral direction, and are not longitudinally displaced from pole tip 503, and thus still coincide with the along-track, longitudinal position of the magnetic write pole 501.

In an illustrative embodiment, ring arms 543 and 545 may also include ferromagnetic pole structures at the distal ends thereof, directly adjacent to the write pole tip 503. The ferromagnetic pole structures at the ends of ring arms 543, 545 may be tuned by appropriate selection of the anisotropy field $H_K$ and the gyromagnetic ratio $\gamma$ to a resonant frequency $\Omega$ of write pole 501.

In another illustrative embodiment, with conductive coils 551 placed proximate to ring arms 543, 545, ring arms 543 and 545 may be positioned as separate components, without a connection to magnetic ring 541, and the remaining portion of magnetic ring 541 distant from the ends of ring arms 543, 545 may be omitted from the structure.

As in other illustrative examples using a conductive wire as the alternating-field component, therefore, ring arms 543 and 545 are configured for providing a microwave-frequency oscillating magnetic field oriented at an angle to the perpendicular magnetic write field provided through pole tip 503. A wide variety of additional configurations may also be used to provide collocated or laterally adjacent alternating-field components and write components to provide microwave-assisted magnetic recording.

The present disclosure therefore includes unexpected and novel advantages as detailed herein and as can be further appreciated from the claims, figures, and description by those skilled in the relevant art. Although some of the embodiments are described in reference to a data storage medium or a data storage system, or to even more particular embodiments such as a disc or a disc drive, the present disclosure encompasses various other embodiments with application to other data storage technologies and a wide variety of other types of devices. Additionally, it is understood that references to a read head or a head may be illustrative examples of a read and/or write head of any type. It is also understood that while different features are disclosed in terms of one or another illustrative embodiments, additional embodiments within the scope of the claims may also include any combination of different features from different embodiments disclosed herein.

It is to be understood that even though numerous characteristics and advantages of various illustrative embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure, to the full extent indicated by the broad, general meaning of the terms in which the appended claims are expressed. It will be appreciated by those skilled in the art that the teachings of the present disclosure can be applied to a family of systems, devices, and means encompassed by and equivalent to the examples of embodiments described, without departing from the scope and spirit of the present disclosure. Further, still other applications for various embodiments, including embodiments pertaining to data storage media and data storage systems, are comprised within the present disclosure.

What is claimed is:

1. A device comprising:
    a magnetic write pole configured to provide a magnetic write field, the magnetic write pole having a gap embedded therein at a bearing surface; and
    an alternating-field generation component disposed in the gap and configured to provide an alternating magnetic field having a microwave frequency and an orientation that is at least partially transverse to the magnetic write field.

2. The device of claim 1, wherein the alternating-field generation component at least partially coincides with the magnetic write pole on an along-track longitudinal position.

3. The device of claim 1, in which the alternating-field generation component comprises a conductive element.

4. The device of claim 3, in which the conductive element is configured to carry an alternating electrical current at a microwave frequency.

5. The device of claim 3, wherein the conductive element comprises a conductive wire.

6. The device of claim 5, in which the conductive element further comprises conductive leads on opposing sides of the magnetic write pole, and the conductive wire is connected to the conductive leads.

7. The device of claim 5, further comprising a yoke on which the magnetic write pole is disposed, and a magnetic return shield disposed longitudinally proximate to the magnetic write pole, and the conductive element further comprises a first conductive lead that passes adjacent to the yoke and a second conductive lead is connected to the return shield, such that the first and second conductive leads connect with the conductive wire.

8. The device of claim 1, wherein the magnetic write pole and the alternating-field generation component are at an approximately equal distance away from a recording medium at their respective closest points to the recording medium.

9. A device comprising:
    a magnetic write pole configured to provide a perpendicular magnetic write field, the magnetic write pole having a gap embedded therein near an air bearing surface; and
    a conductive wire in the gap, wherein the conductive wire is configured to provide a microwave-frequency oscillating magnetic field.

10. The device of claim 9, further comprising first and second conductive leads connected to the conductive wire, wherein the microwave-frequency oscillating magnetic field is oriented at an angle to the perpendicular magnetic write field.

11. The device of claim 10, further comprising:
    a moveable magnetic recording medium;
    a suspension apparatus, moveably disposed proximate to the magnetic recording medium; and
    a magnetic head, disposed on the suspension apparatus and positionable by the suspension apparatus proximate to the magnetic recording medium, wherein the magnetic write pole, the conductive wire, and the first and second conductive leads are disposed on the magnetic head, and wherein the conductive wire is configured to provide the microwave-frequency oscillating magnetic field to a position on the magnetic recording medium that overlaps the perpendicular magnetic write field.

12. A device comprising:
    a magnetic write pole configured to provide a perpendicular magnetic write field, the magnetic write pole having a gap embedded therein at a bearing surface; and
    means, positioned in the gap, for providing a microwave-frequency oscillating magnetic field.

13. The device of claim 12, further comprising first and second conductive leads connected to the means for providing the microwave-frequency oscillating magnetic field, wherein the microwave-frequency oscillating magnetic field is oriented at an angle to the perpendicular magnetic write field.

14. The device of claim 12, further comprising:
    a moveable magnetic recording medium;
    a suspension apparatus, moveably disposed proximate to the magnetic recording medium; and a magnetic head, disposed on the suspension apparatus and positionable by the suspension apparatus proximate to the magnetic recording medium, wherein the magnetic write pole, the means for providing the microwave-frequency oscillating magnetic field, and the first and second conductive leads are disposed on the magnetic head, and wherein the means for providing the microwave-frequency oscillating magnetic field is configured to provide the microwave-frequency oscillating magnetic field to a position on the magnetic recording medium that overlaps the perpendicular magnetic write field.

* * * * *